United States Patent [19]

Barthomieux et al.

[11] Patent Number: 5,162,462

[45] Date of Patent: Nov. 10, 1992

[54] PROCESS FOR THE PREPARATION OF AMINOPLASTIC RESIN FOR USE IN THE PRODUCTION OF PARTICLE BOARDS WITH LOW FORMALDEHYDE EMISSION

[75] Inventors: Jeanine Barthomieux, Pinsaguel; Roger Garrigue; Jack Lalo, both of Toulouse, all of France

[73] Assignee: Norsolor (Orkem Group), Paris, France

[21] Appl. No.: 747,508

[22] Filed: Aug. 20, 1991

Related U.S. Application Data

[63] Continuation of Ser. No. 289,102, Dec. 23, 1988, abandoned.

[30] Foreign Application Priority Data

Dec. 23, 1987 [FR] France ............................. 87 18001

[51] Int. Cl.⁵ .............................................. C08L 61/20
[52] U.S. Cl. ................................... 525/549; 528/256; 528/258; 428/528
[58] Field of Search ................ 525/509; 528/256, 258; 428/528

[56] References Cited

U.S. PATENT DOCUMENTS

| | | | |
|---|---|---|---|
| 2,675,338 | 4/1954 | Phillips | 525/163 |
| 2,898,324 | 8/1959 | MacKay | 525/515 |
| 3,488,310 | 1/1970 | McCombs | 525/509 |
| 3,994,850 | 11/1976 | Willegger et al. | 525/509 |
| 4,082,904 | 4/1978 | Bornstein | 525/509 |
| 4,250,282 | 2/1981 | Dörries et al. | 525/509 |
| 4,362,827 | 12/1982 | Tinkelenberg et al. | 524/9 |

FOREIGN PATENT DOCUMENTS 962875  6/1950  France .

OTHER PUBLICATIONS

Chemical Abstracts, vol. 74, No. 36, 1971, Abstract No. 4199x.

*Primary Examiner*—James J. Seidleck
*Assistant Examiner*—W. R. H. Clark
*Attorney, Agent, or Firm*—Millen, White & Zelano

[57] ABSTRACT

Process for the production of aminoplast resins. The process entailing the addition of ureido-2-diamino-4,6-triazine-1,3,5, and optionally melamine, to aminoplast resin. Preferably the triazine is added in a proportion of at least 10% by weight. The resultant aminoplasts can be used to make panels from particles.

10 Claims, No Drawings

PROCESS FOR THE PREPARATION OF AMINOPLASTIC RESIN FOR USE IN THE PRODUCTION OF PARTICLE BOARDS WITH LOW FORMALDEHYDE EMISSION

This application is a continuation, of application Ser. No. 07,289,102, filed Dec. 23, 1988; now abandoned.

BACKGROUND OF THE INVENTION

The present invention concerns a process for the production of aminoplastic resins. Its object is more particularly a process for the production of aminoplastic resins that enables chipboard to be produced that gives off little formaldehyde and that has improved mechanical properties.

The chipboard is usually produced by hot pressing a mass of wood chips or other cellulosic matter mixed with binders, in particular solutions of urea-formaldehyde or melamine-urea-formaldehyde resins. The pressing temperatures are generally about 150° to 220° C. so as to obtain good adhesion of the chips in an acceptable production time, using high pressure up to 70 bars.

The main drawback of aminoplastic resins is that they give off large amounts of free formaldehyde. Attempts have been made to reduce the free formaldhyde content by developing various production processes. Unfortunately, when particularly low formaldehyde contents are aimed at, experience shows that this objective is accompanied by a deterioration in the mechanical properties of the finished boards. It has also been proposed that the presence of formaldehyde could be avoided by using formaldehyde-free resins, in particular resins based on isocyanate solutions. Unfortunately the problems associated with formaldehyde are replaced by those associated with isocyanates, whose action on man is more harmful and more durable than that of formaldehyde since the presence of free isocyanate groups has been demonstrated in the boards many years after they were produced. Moreover the use of such resins in molding presses poses serious de-moulding problems due to the affinity of isocyanates for metallic components. It has also been proposed that processes should be used comprising spraying the two binders separately onto the chips: such processes are awkward due to the low proportion of isocyanate that may economically be used.

The need is therefore felt for aminoplastic resins to be developed having low formaldehyde contents and whose use produces finished boards emitting little formaldehyde, and possessing good mechanical characteristics.

SUMMARY OF THE INVENTION

The present invention concerns a process for the production of aminoplastic resins characterized in that 2-ureido-4,6-diamino-triazine-1,3,5 is added to the aminoplastic resin, and optionally melamine.

According to another characteristic of the process of the invention, the quantity of 2-ureido-4,6-diaminotriazine-1,3,5 is added in proportions of 0.1 to 10% by weight relative to the weight of resin solution, the quantity of melamine optionally added being up to a maximum of 10% by weight relative to the weight of resin solution.

The use of such a process for the production of aminoplastic resins, in particular in the production of aminoplastic resins for use as adhesives for wood, has been found to enable particle board or plywood to be produced which have lower rates of emission of formaldehyde as well as improved mechanical properties. According to the invention, 2-ureido-4,6-diamino-triazine-1,3,5 may be added to the aminoplastic resin alone, in a quantity of between 0.1 and 10% relative to the weight of aminoplastic resin solution. According to another characteristic of the process of the invention, melamine may be added in association in quantities of up to a maximum of 10% by weight relative to the weight of resin solution: in this case a synergic effect is observed, manifested both in a reduced rate of emission of free formaldehyde and in an enhanced improvement of the finished boards, mechanical properties.

The process of the present application may be operated in various ways. According to a first characteristic of the process of the invention, the 2-ureido-4,6-diamino-triazine-1,3,5 is added to the aminoplastic resin at the moment of use, preferably as a solution in formaldehyde. According to a second characteristic of the process of the invention the 2-ureido-4,6-diaminotriazine-1,3,5 is added during the synthesis of the aminoplastic resin, the quantity used being identical to the quantity of urea substituted at equivalent $NH_2$ functions. According to a third characteristic of the process of the invention, when the 2-ureido-4,6-diaminotriazine-1,3,5 is added in conjunction with melamine, the two additives are added during the synthesis of the aminoplastic resin. By way of example in the case of a urea-formaldehyde resin considered as an aminoplastic resin, the process comprises a first stage in which urea, formaldehyde and melamine first undergo addition at close to neutral pH (pH between 6 and 9) at reflux temperature, in a second stage condensation is carried out at pH close to 5.5, and in a third stage the 2-ureido-4,6-triazine-1,3,5 is added dissolved in a ureaformaldehyde precondensate at a temperature of 70.C and at pH close to 8.5, then urea is added to adjust the $F/NH_2$ molar ratio to that of the final resin. The two reagents may also be added separately, i.e., one during and the other after the synthesis of the aminoplastic resin. Whatever the operating procedure followed, the quantities of reagents used to obtain the aminoplastic resins correspond to the amounts present in known resins, namely to a $F/NH_2$ molar ratio between 0.42 and 1.

The aminoplastic resins used when carrying out the process of the invention are produced by known means. In the case of urea-formaldehyde resins they are prepared by condensation of urea and formaldehyde at pH between 4 and 7 at a temperature near boiling point: preferably this condensation reaction is carried out in several stages. The 2-ureido-4,6-diamino-triazine-1,3,5 used in carrying out the process of the invention may, as is known, be obtained by the reaction of 2-chloro-4,6-diamino with sodium-urea, or by reaction of melamine with potassium cyanate in hydrochloric medium, or again by reaction of melamine and urea in orthocresol. It is preferably prepared by the process described in a commonly owned French Patent Application under the title: "Nouveau procédé de preparation of dérivées uréo-aminés triaziniques" ("New process for the preparation of ureido-amino triazine derivatives"), said French application bearing Serial Number 8717999, filed Dec. 23, 1987, inventor: R. GARRIGUE and J. LALO, said application being incorporated by reference herein. According to this process, urea and melamine are reacted in any molar ratio in dimethylformamide.

The following examples illustrate the present invention. All quantities are expressed as parts by weight.

EXAMPLE 1

2-ureido-4,6-diamino-triazine-1,3,5, is prepared according to the process described in the aforesaid French Patent Application 8717999, which generally comprises reacting melamine and urea in all molar ratios in dimethyl formamide, the reaction being maintained at reflux temperature for at least six hours and then washing the resultant solution with an alkaline solution.

100 parts by weight of 2-ureido-4,6-diaminotriazine-1,3,5 are dissolved in 285 parts by weight of a 37% solution of formaldehyde. The reaction mixture is heated to 90° C. with pH maintained at 7 by means of 1% by weight based on the total quantity of reagents of a buffer mixture consisting of $NaH_2PO_4$ and $Na_2HPO_4$. After cooling the whole mass of mixture sets; it is then filtered, washed with water and with acetone.

5 parts by weight of 2-ureido-4,6-diamino-ureidotriazine-1,3,5 formulated as above are added to 100 parts by weight of a urea-formaldehyde resin of $F/NH_2$ molar ratio 0.53. Boards are made with the resulting resin. The properties of the resulting boards are summarized in Table 1.

EXAMPLE 2

A resin containing 5% of 2-ureido-4,6-diaminotriazine-1,3,5 is prepared by conventional means.

Three resins are produced having final $F/NH_2$ molar ratios of 0.55, 0.5 and 0.48.

TABLE 1

| Resin | Reference urea-formaldehyde resin | Example 1 |
|---|---|---|
| $F/NH_2$ | 0.535 | |
| viscosity (Pa s) | 0.74 | |
| pH | 8 | |
| Solids content | 66.64 | |
| Adhesive mixture | | |
| curing time (minutes) | 4 | 4 |
| viscosity at 20° C. mPa s | 70 | 80 |
| duration of spraying (seconds) | 90 | 130 |
| mixing time (seconds) | 420 | 150 |
| Boards | | |
| thickness on leaving press | 16.6 mm | 16.6 mm |
| dry tensile strength N.mm² | 0.65 | 0.8 |
| relative density (kg/m³) | 680 | 680 |
| swelling V20 | 8.3 | 7.9 |
| humidity of boards | 7.7 | 7.5 |
| perforator formaldehyde (mg per 100 g of dry board) | 9.7 | 9.6 |

The measurements were made according to the following standards:
Formaldehyde content (perforator): Standard EN 120
Thickness, relative density: Standard NFB 51222
Tensile strength V20: Standard NFB 51250
Swelling %: Standard NFB 51252

In each test the urea-formaldehyde resin was produced in the following manner:

Test 1

150 parts of 2-ureido-4,6-diamino-triazine-1,3,5, 325 parts of urea and 216 parts of water are added to 1600 parts of an aqueous solution of formaldehyde and urea (formaldehyde: 24.5 moles; urea: 4.93 moles). The mixture, whose pH has been adjusted to 7, is refluxed for 20 minutes. The condensation is then carried out at pH=5. 640 parts of urea are then added to the resin. The resulting resin has the characteristics shown in Table 2.

Test 2

This test uses 1600 parts of an aqueous solution of urea-formaldehyde, 159.6 parts of 2-ureido-4,6-diamino-triazine-1,3,5 then 320 parts of urea and 218 parts of water. At the completion of synthesis, 773 parts of urea are added, the properties of the resulting resin are shown in Table 2.

Test 3

This test uses 1600 parts of an aqueous solution of ureaformaldehyde, 164 parts of 2-ureido-4,6-diamino-triazine-1,3,5, 317.7 parts of urea and 219 parts of water. At the completion of synthesis 835 parts of water are added. The characteristics of the resin are shown in Table 2.

TABLE 2

| Test | 1 | 2 | 3 |
|---|---|---|---|
| final $F/NH_2$ | 0.55 | 0.5 | 0.48 |
| viscosity at 20° C. (mPa s) | 360 | 300 | 240 |
| gelling time at 80° C. (s) | 300 | 305 | 360 |
| water tolerance at 20° C. | 1.75/1 | 1.5/1 | 1.5/1 |
| Solids content % | 65.4 | 64 | 64 |

The mixtures so obtained are used to produce boards. The characteristics of these boards are summarized in Table 3.

The boards are produced under the following conditions:
Board thickness: 17 mm
Material: wood chip mixtures
Curer: 1.5% dry ammonium chloride relative to the dry resin
Duration of pressing: 4 minutes
Temperature at which pressing is carried out: 180° C.
Pressure applied: 20 bars

TABLE 3

| Resins | Control | Test 1 | Test 2 | Test 3 |
|---|---|---|---|---|
| $F/NH_2$ | 0.535 | 0.55 | 0.50 | 0.48 |
| viscosity (mPa s) | 350 | 360 | 300 | 240 |
| pH | 9.2 | 9.2 | 9.2 | 9.2 |
| solids content | 65.1 | 65.4 | 64 | 64.2 |
| tensile strength N/mm² for relative density of 650 kg/m³ | 0.64 | 0.66 | 0.61 | 0.44 |
| swelling cold water 24 hours % | 14 | 11.4 | 13.8 | 15 |
| perforator formaldehyde mg/100 g | 9.5 | 6.3 | 4.6 | 3.4 |

EXAMPLE 3

20 parts of melamine, 77 parts of urea and 67 parts of water are added to 350 parts of an aqueous solution of formaldehyde and urea (urea: 1.18 moles; formaldehyde: 5.7 moles). The mixture, whose pH has been adjusted to 8, is refluxed for 20 minutes. Condensation is then carried out at pH=5. When the condensation reaction is complete, pH is adjusted to 7 and a solution containing 95 parts of formaldehyde, 39.7 parts of urea, 20 parts of 2-ureido-4,6-diamino-traizine-1,3,5 and 80 parts of water, which has previously been homogenized at 80° C. and at pH 8.5, are added. When addition is complete, 270 parts of urea are added to the resin. The resulting resin has the following characteristics:
solids content: 65% viscosity at 20° C.: 1.80 mPa s
gelling time at 80° C.: 205 s
water tolerance: 2.2/1

The characteristics of boards produced are summarized in table 4

TABLE 4

| Resins | Resin of Comparison | Resin example |
|---|---|---|
| F/NH$_2$ | 0.535 | 0.55 |
| viscosity mPa s | 360 | 180 |
| solids content | 64.4 | 65.2 |
| Adhesive mixture | | |
| viscosity mPa s | 60 | 52 |
| gelling time (100° C.) | 95 | 170 |
| Boards | | |
| Swelling cold water 24 hours % | 14.25 | 9.5 |
| absorption cold water 24 hours % for relative density of 650 kg/m$^3$ | 50 | 34 |
| tensile strength N/mm$^2$ for relative density 650 kg/m3 | 0.6 | 0.68 |
| perforator formaldehyde mg per 100 g | 8.7 | 8.8 |

EXAMPLE 4

30 parts of melamine, 61 parts of urea and 630 parts of water are added to 318 parts of an aqueous solution of urea and formaldehyde (urea: 1.07 moles, formaldehyde: 5.18 moles). The mixture, whose pH has been adjusted to 8, is refluxed for 20 minutes. Condensation is the carried out at pH 5. When condensation is complete, pH is adjusted to 7 and a solution containing 103 parts of formaldehyde, 43.1 parts of urea, 30 parts of 2-ureido-4,6-diamino-triazine-1,3,5 and 90 parts of water, which has previously been homogenized at 80° C. and pH 8.5, is added. Then, 276.5 parts of urea are added to the resin. Boards are produced with the resulting resin.

The characteristics of the resulting boards are summarized in Table 5, which also shows, by way of comparison, results obtained with a reference ureaformaldehyde resin having the same F/NH$_2$ ratio (resin A) and another reference resin (resin B) having the same F/NH$_2$ ratio also containing 6% of melamine.

TABLE 5

| Resins | Comparison resin A | Comparison resin B | Resin of example 4 |
|---|---|---|---|
| dry tensile strength N/mm$^2$ for a density of 650 kg/m$^3$ | 0.7 | 0.76 | 0.77 |
| swelling V20 (%) | 14.1 | 12.2 | 11.7 |
| absorption (%) | 47 | 44 | 37 |
| perforator formaldehyde mg/100 g | 8.7 | 10.4 | 7.4 |

EXAMPLE 5

This example is designed to show the synergy between the melamine and the 2-ureido-4,6-diamino-triazine-1,3,5

I) Preparation of the following resins

1) Resin C containing 4% of 2-ureido-4,6-diamino-triazine-1,3,5.

151 parts of urea and 109 parts of water are added to 564.3 parts of an aqueous solution of formaldehyde and urea (1.9 moles of urea and 9.3 moles of formaldehyde). The mixture, whose pH has been adjusted to 7, is refluxed for 20 minutes. Condensation is then carried out at pH 5. When the condensation reaction is complete, the pH is adjusted to 7 and a solution containing 89 parts of urea, 217.5 parts of formaldehyde, 134 parts of water and 80 parts of 2-ureido-4,6-diamino-triazine-1,3,5, which has previously been homogenized at 80° C. at pH 8.5, is added. After distilling out 36 parts of water and cooling, 626 parts of urea are added.

The resin's characteristics are as follows:
Solids content: 64.56%
Viscosity at 20° C.: 730 Pa s
Gelling time at 80° C. measure in tube—660 s (pasty)
F/NH=0.485

2) Resin containing 2% of 2-ureido-4,6-diaminotriazine-1,3,5 and 2% of melamine (resin D).

145 parts of urea, 130.7 parts of water and 40 parts of melamine are added to 61.7 parts of an aqueous solution of formaldehyde- and urea (2.18 moles of urea and 10.65 moles of formaldehyde). The mixture, whose pH has been adjusted to 8, is refluxed for 20 minutes. Condensation is then carried out at pH 5. When the condensation reaction is complete, pH is adjusted to 7 and a solution containing 73.2 parts of urea, 179 parts of formaldehyde, 110 parts of water and 40 parts of 2-ureido-4,6-diamino-triazine-1,3,5, which has previously been homogenized at 80° C. and pH =8.5, is added. After distilling out 35 parts of water and cooling, 629 parts of urea are added.

The resin's characteristics are as follows:
Solids content=64.07%
Viscosity at 20° C.: 120 mPa s
Gelling time at 80° C. measured in tube - 720 sec, (pasty)

3) Resin containing 4% of 2-ureido-4,6-diaminotriazine-1,3,5 and 2% melamine (resin E). 121.45 parts of urea, 113 parts of water and 40 parts of melamine are added to 558.8 parts of an aqueous solution of formaldehyde and urea (1.88 moles of urea and 276 moles of formaldehyde). The mixture, whose pH has been adjusted to 8, is refluxed for 20 minutes. Condensation is then carried out at pH 5. When the condensation reaction is complete, the pH is adjusted to 7 and a solution containing 88.52 parts of urea, 216.4 parts of formaldehyde, 80 parts of 2-ureido-4,6-diamino-triazine-1,3,5 and 133.2 parts of water, which has previously been homogenized at 80° C. and pH 8.5, is added. After distilling out 39 parts of water and cooling, 621 parts of urea are added.

The resin's characteristics are as follows:
Solids content—64.4%
Viscosity at 20° C.—460 mPa s
Gelling time at 80° C. measured in tube—12.00 sec. (pasty)

II) Application to the preparation of particle boards

The previously-described resins were used to prepare particle boards. The operating conditions are as follows:
Pressing:
Pressure 30 daN/cm$^2$
Temperature 185° C.
Time to full pressure—30 sec
Time at constant pressure—12 sec/mm
Pre-pressing: pressure 5 daN/cm$^2$
Time 1 mn.
Boards in monolayer configuration
Chips of maritime pine (pin des Landes) ("interior" mix)
Adhesive applied: 7% dry resin/dry wood.
The adhesive mixtures are as follows:

adhesive mixture 52%
Paraffin—(Mobilier 72)
0.5% dry/ dry chips
Catalyst NH₄Cl: 1.5% dry/dry resin

III Results

Boards prepared in this manner were checked, the results are described in Table 6, where they are compared with those obtained using an urea-formaldehyde resin (resin F) having the same F/NH$_2$ ratio containing 6% of melamine.

| RESIN | C | D | E | F |
|---|---|---|---|---|
| Proportion of 2-ureido-4,6-diamino-triazine-1,3,5 | 4 | 2 | 4 | 0 |
| proportion of MELAMINE | 0 | 2 | 2 | 6 |
| F/NH$_2$ | 0.485 | 0.485 | 0.485 | 0.485 |
| Thickness on leaving press (mm) | 17.25 | 17.15 | 17.1 | 17.15 |
| Perforator formaldehyde acetylacetone mg/100 g | 7.5 | 7.4 | 7 | 7 |
| Swelling | 15.8 | 13.2 | 12.7 | 12.6 |
| Absorption % for relative density of 660 kg/m$^3$ | 56 | 48.9 | 48 | 47.8 |
| Tensile strength N/mm$^2$ for relative density of 660 kg/m$^3$ | 0.56 | 0.63 | 0.61 | 0.58 |
| Flexural strength N/mm$^2$ for mass per unit volume of 660 kg/m$^3$ | 11.7 | 12.3 | 13.2 | 12.5 |

We claim:

1. In a process for lowering the rate of emission of formaldehyde from particle boards which consists essentially of mixing an aqueous solution of amioplastic resin with wood chips and forming the particle board under heat and pressure, the improvement consisting essentially of incorporating 2-ureido-4,6-diamino-triazine-1,3,5 and optionally melamine to an aqueous solution of the aminoplast resin resulting in an aqueous solution consisting essentially of said aminoplast resin azine being added in proportions of 0.1 to 10% by weight relative to the weight of said aqueous resin solution and the quantity of melamine being up to a maximum of 10% by weight relative to the weight of said aqueous resin solution, said solution being essentially free of isocyanate, whereby said 2-ureido-4,6-diamino-traizine-1,3,5 provides a combination of a low rate of emission of formaldehyde from said particle board, together with improved mechanical properties thereof.

2. Particle board produced in accordance with claim 1.

3. A process according to claim 1, wherein melamine is added to the aminoplastic resin.

4. Particle board produced in accordance with claim 3.

5. A process according to claim 1, wherein said solution is free of isocyanate.

6. A process according to claim 1, wherein said 2-ureido-4,6-diamino-traizine-1,3,5 is added in proportions of 2–10% by weight relative to the weight of said aqueous resin solution.

7. A particle board according to claim 2, wherein said 2-ureido-4,6-diamino-triazine-1,3,5 is added in proportions of 2–10% by weight relative to the weight of said aqueous resin solution.

8. A process according to claim 3, wherein said 2-ureido-4,6-diamino-traizine-1,3,5 is added in proportions of 2–10% by weight relative to the weight of said aqueous resin solution.

9. A particle board according to claim 4, wherein said 2-ureido-4,6-diamino-traizine-1,3,5 is added in proportions of 2–10% by weight relative to the weight of said aqueous resin solution.

10. A process according to claim 5, wherein said 2-ureido-4,6-diamino-traizine-1,3,5 is added in proportions of 2–10% by weight relative to the weight of said aqueous resin solution.

* * * * *